(12) United States Patent
Albanese

(10) Patent No.: US 9,265,262 B1
(45) Date of Patent: Feb. 23, 2016

(54) HAND HELD DEER DE-HIDE TOOL

(76) Inventor: John L. Albanese, Springfield, LA (US)

(*) Notice: Subject to any disclaimer, the term of this patent is extended or adjusted under 35 U.S.C. 154(b) by 704 days.

(21) Appl. No.: 13/440,645

(22) Filed: Apr. 5, 2012

Related U.S. Application Data

(60) Provisional application No. 61/472,234, filed on Apr. 6, 2011.

(51) Int. Cl.
*A22B 5/16* (2006.01)

(52) U.S. Cl.
CPC ........................................ *A22B 5/16* (2013.01)

(58) Field of Classification Search
USPC ............... 452/125, 132, 102–105, 1–6, 9
See application file for complete search history.

(56) References Cited

U.S. PATENT DOCUMENTS

| | | | |
|---|---|---|---|
| 901,016 A | 10/1908 | Little | |
| 2,261,749 A | 11/1941 | Walsh | |
| 2,488,734 A | 11/1949 | Mueller | |
| 2,654,120 A * | 10/1953 | Tifft | 452/132 |
| 3,395,421 A * | 8/1968 | Harless, Jr. | 452/6 |
| 3,902,206 A | 9/1975 | Naquin | |
| 3,996,645 A * | 12/1976 | Bordewick | 452/128 |
| 4,306,336 A | 12/1981 | Kovar | |
| 4,635,319 A | 1/1987 | Gast | |
| 4,710,998 A | 12/1987 | Gast | |
| 4,729,150 A * | 3/1988 | Breaux et al. | 452/105 |
| 4,787,109 A * | 11/1988 | Bennett et al. | 7/106 |
| 5,626,513 A * | 5/1997 | Curtis | 452/125 |
| 6,019,673 A * | 2/2000 | Saizon | 452/6 |
| 6,988,549 B1 | 1/2006 | Babcock | |
| 7,169,033 B1 * | 1/2007 | Colbert | 452/103 |
| 7,481,700 B1 * | 1/2009 | Leboeuf, Jr. | 452/6 |
| 7,588,487 B1 | 9/2009 | Born | |
| 7,992,466 B2 | 8/2011 | Farrell | |

* cited by examiner

*Primary Examiner* — Richard Price, Jr.
(74) *Attorney, Agent, or Firm* — Jones Walker LLP

(57) ABSTRACT

A tool having a first and second handle, pivotally coupled between a tool open position and a tool closed position, each handle having a working end and a gripping end. A jaw is positioned on each working end, and each handle has a cutout positioned between the working end and the jaw, where the cutouts are aligned to create an opening in the tool when closed. The tool has a first cutting blade having a first cutting surface, where the first cutting blade is removably attached to one of the handles. One of said handles also has a rearward fixed projecting finger, positioned intermediary the jaws and the pivot point of the tool handle.

16 Claims, 17 Drawing Sheets

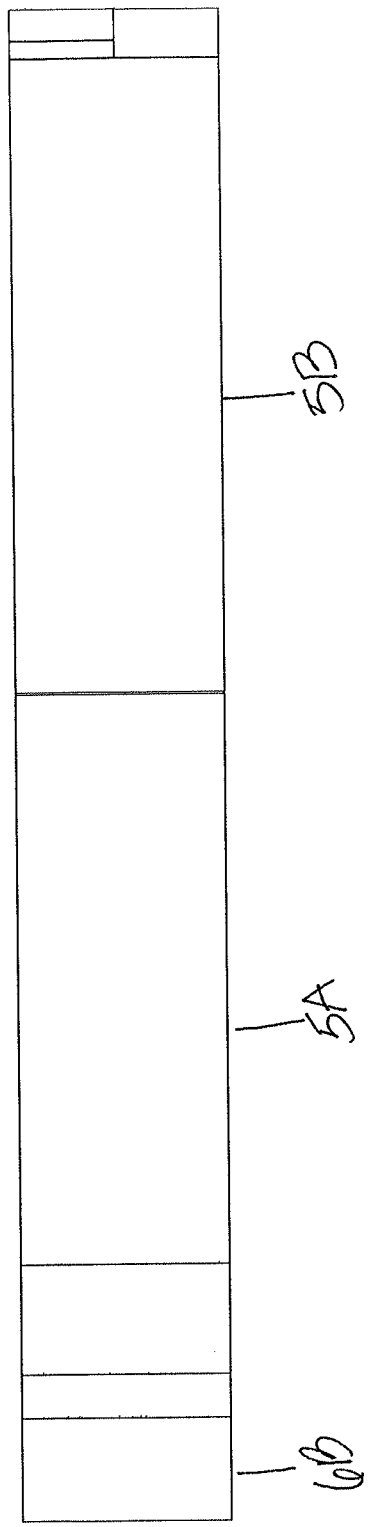

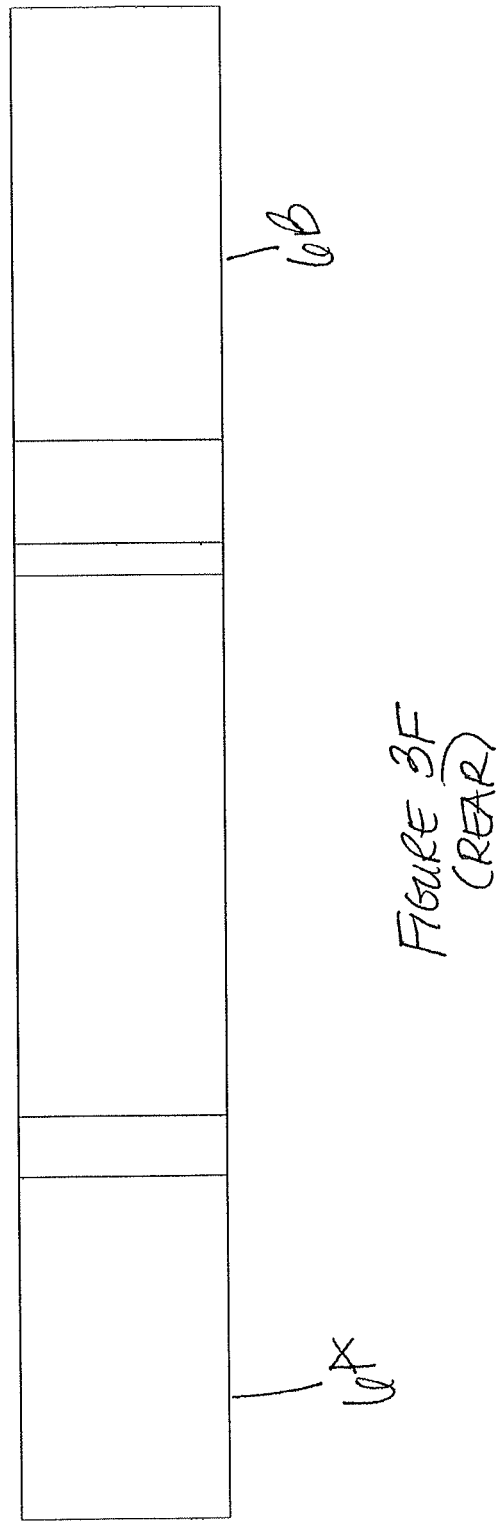
FIGURE 3F (REAR)

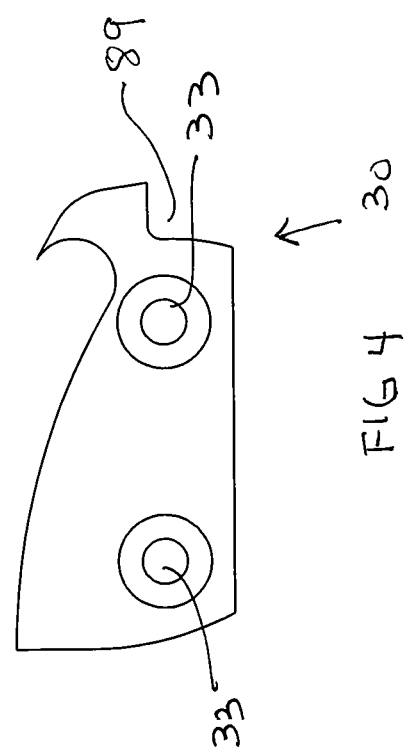

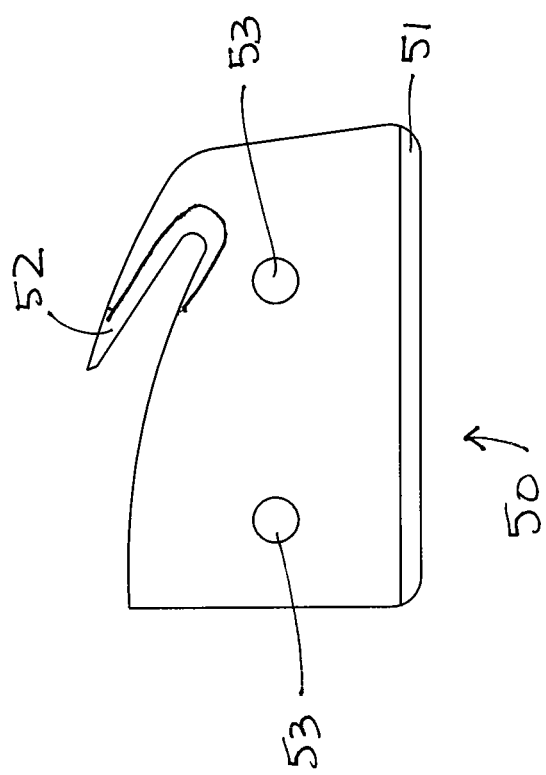

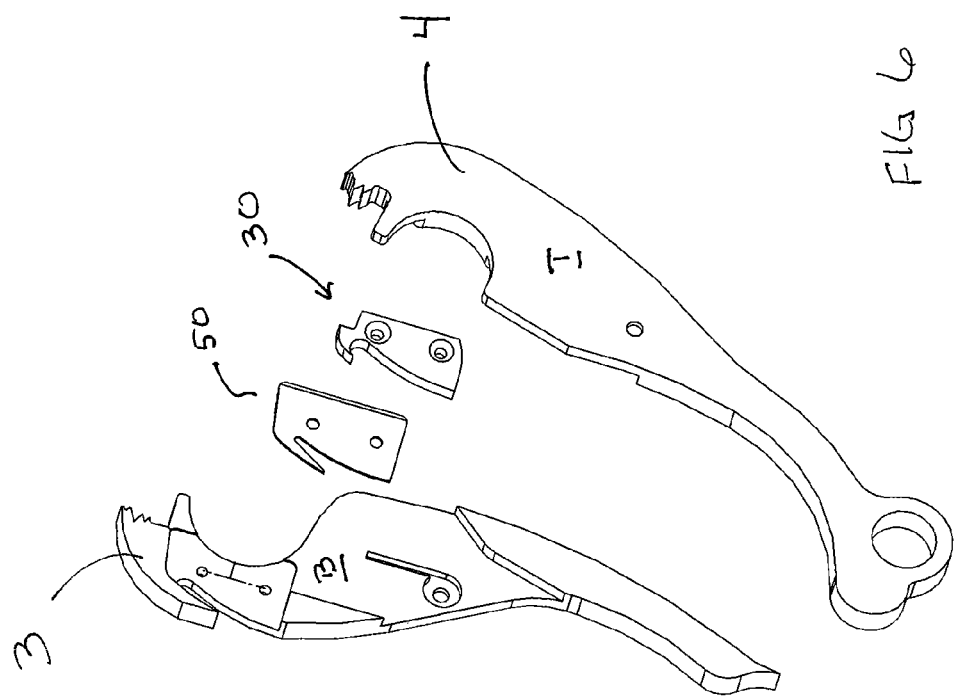

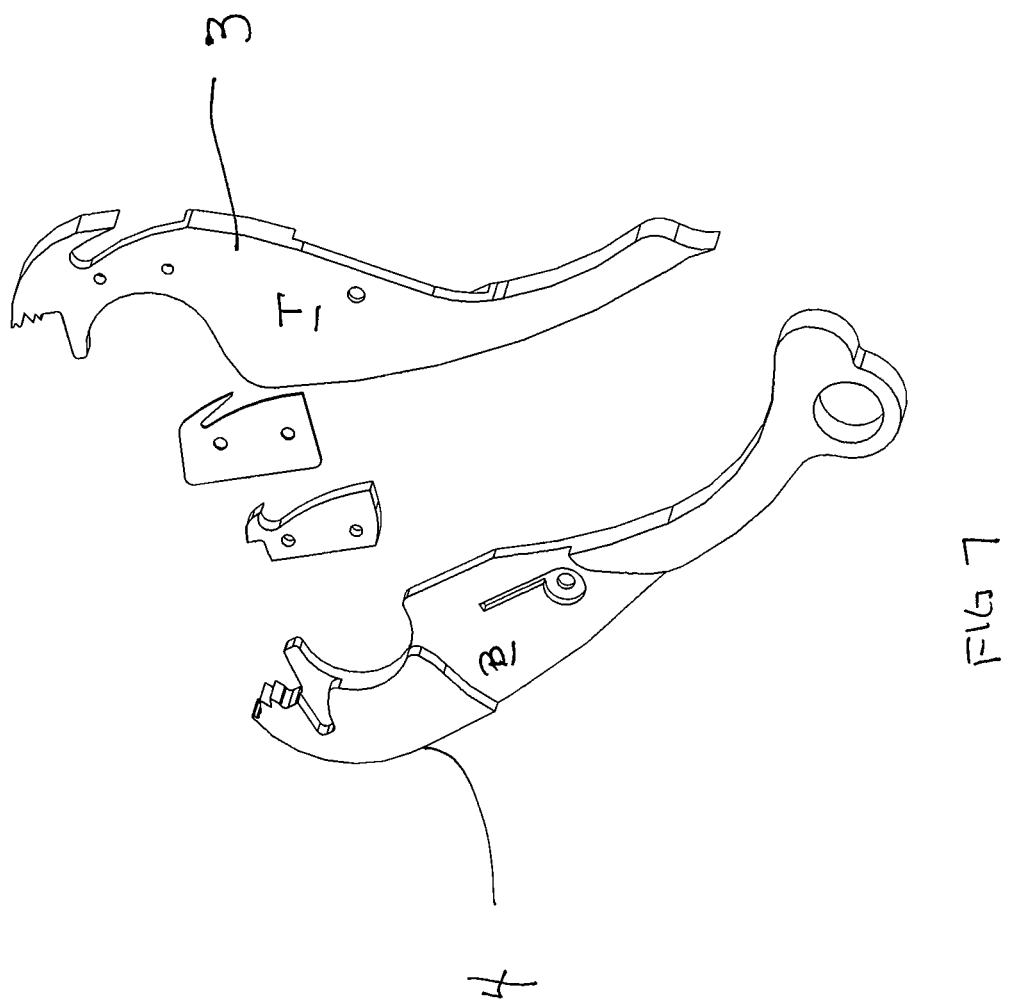

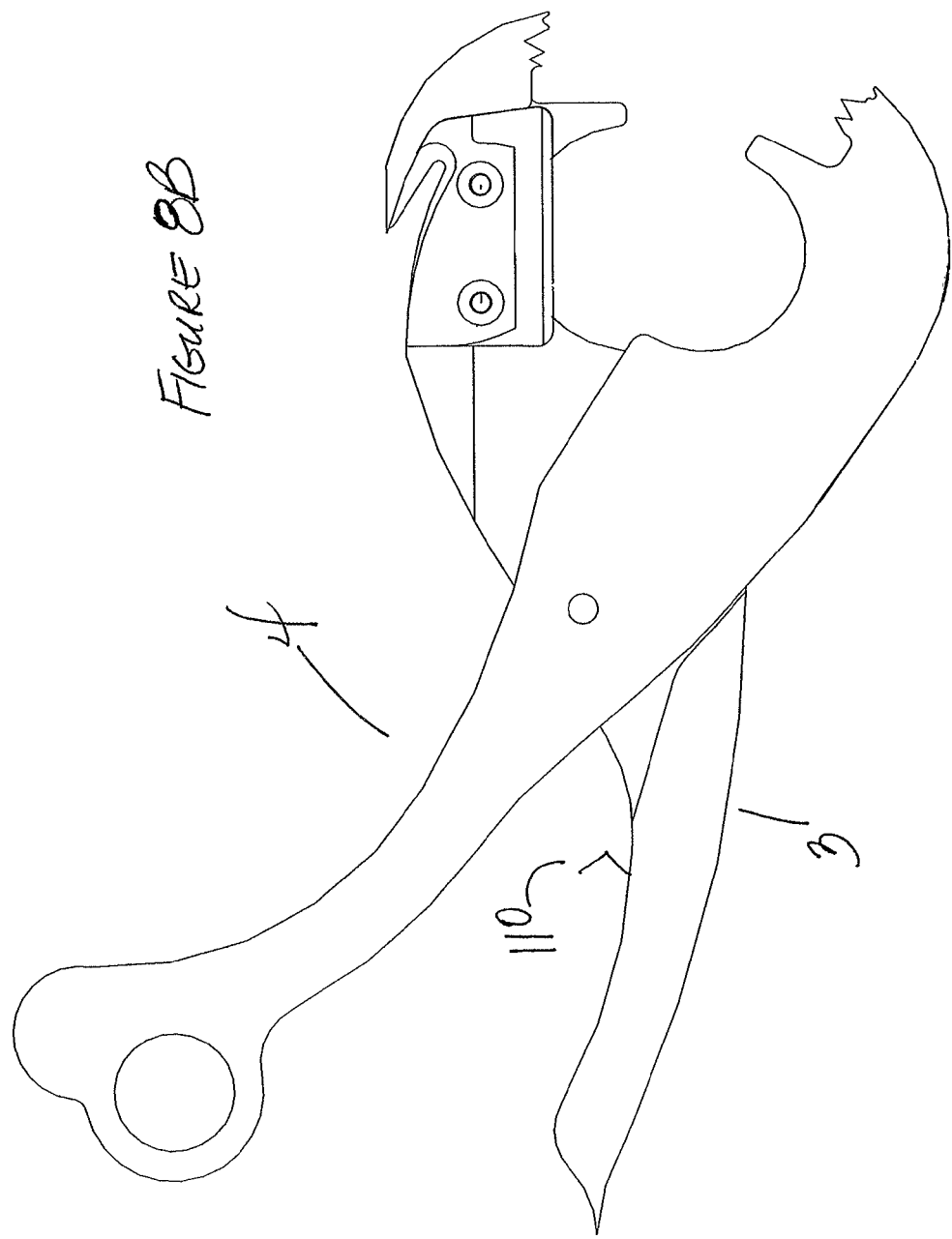

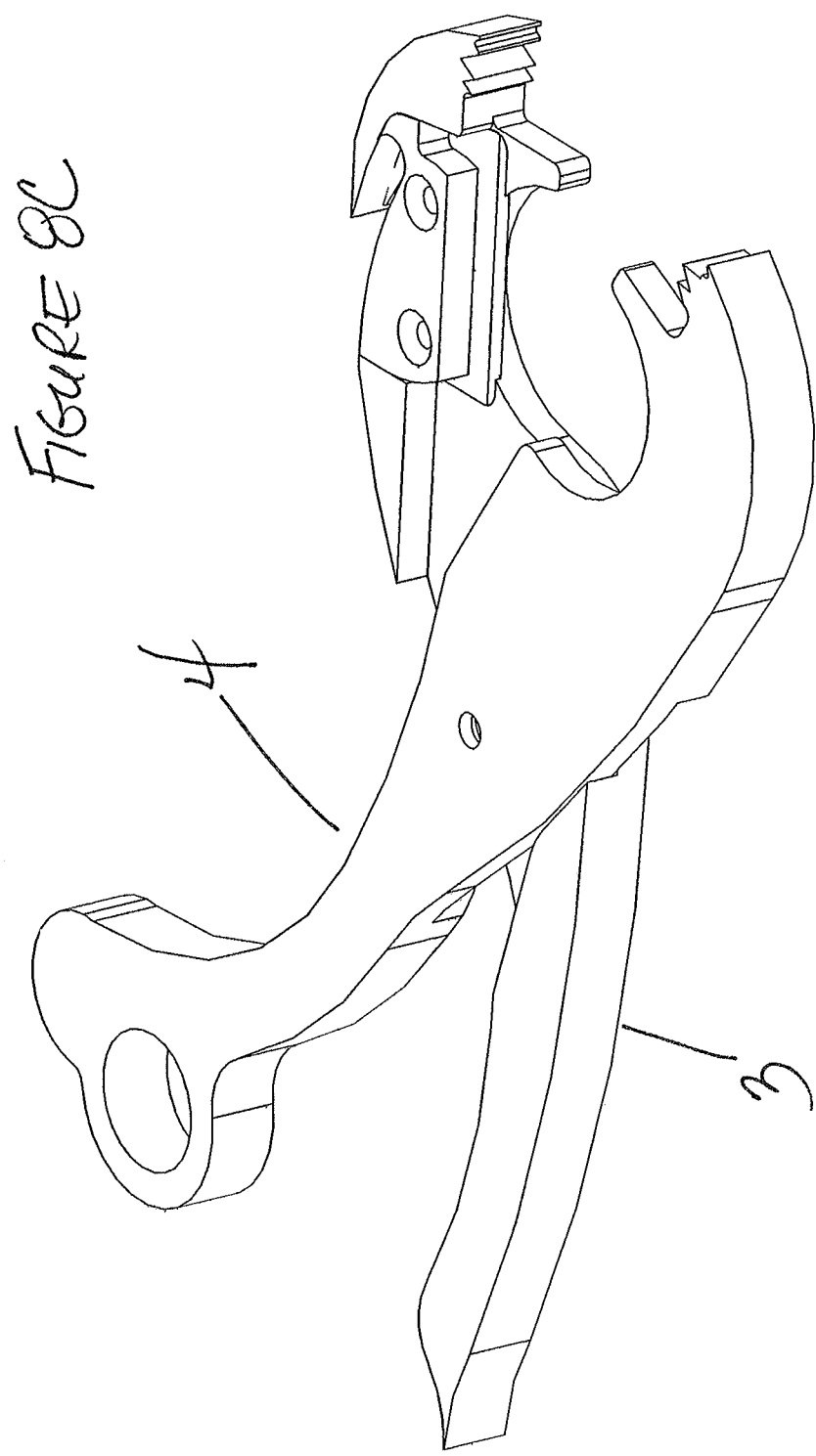

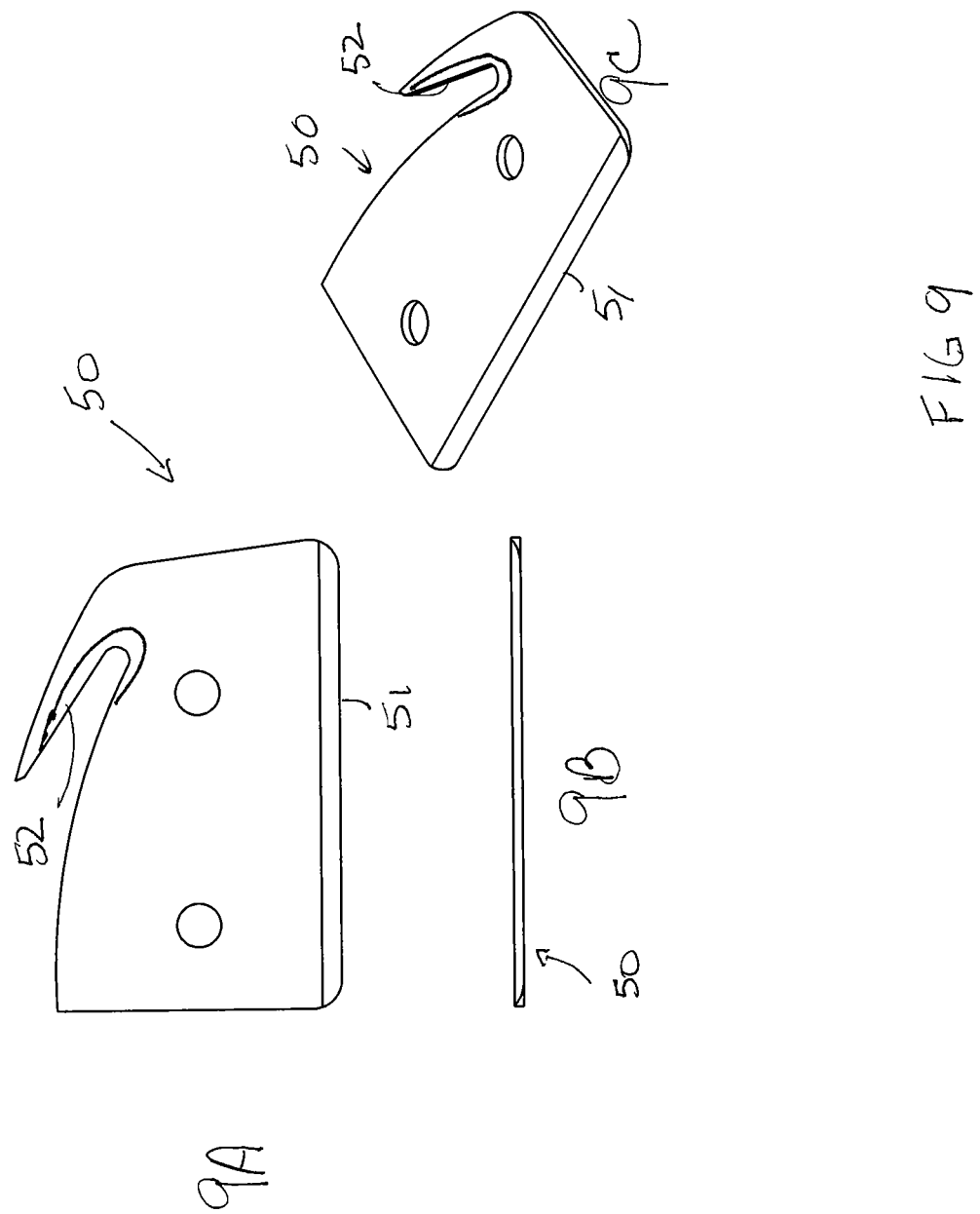

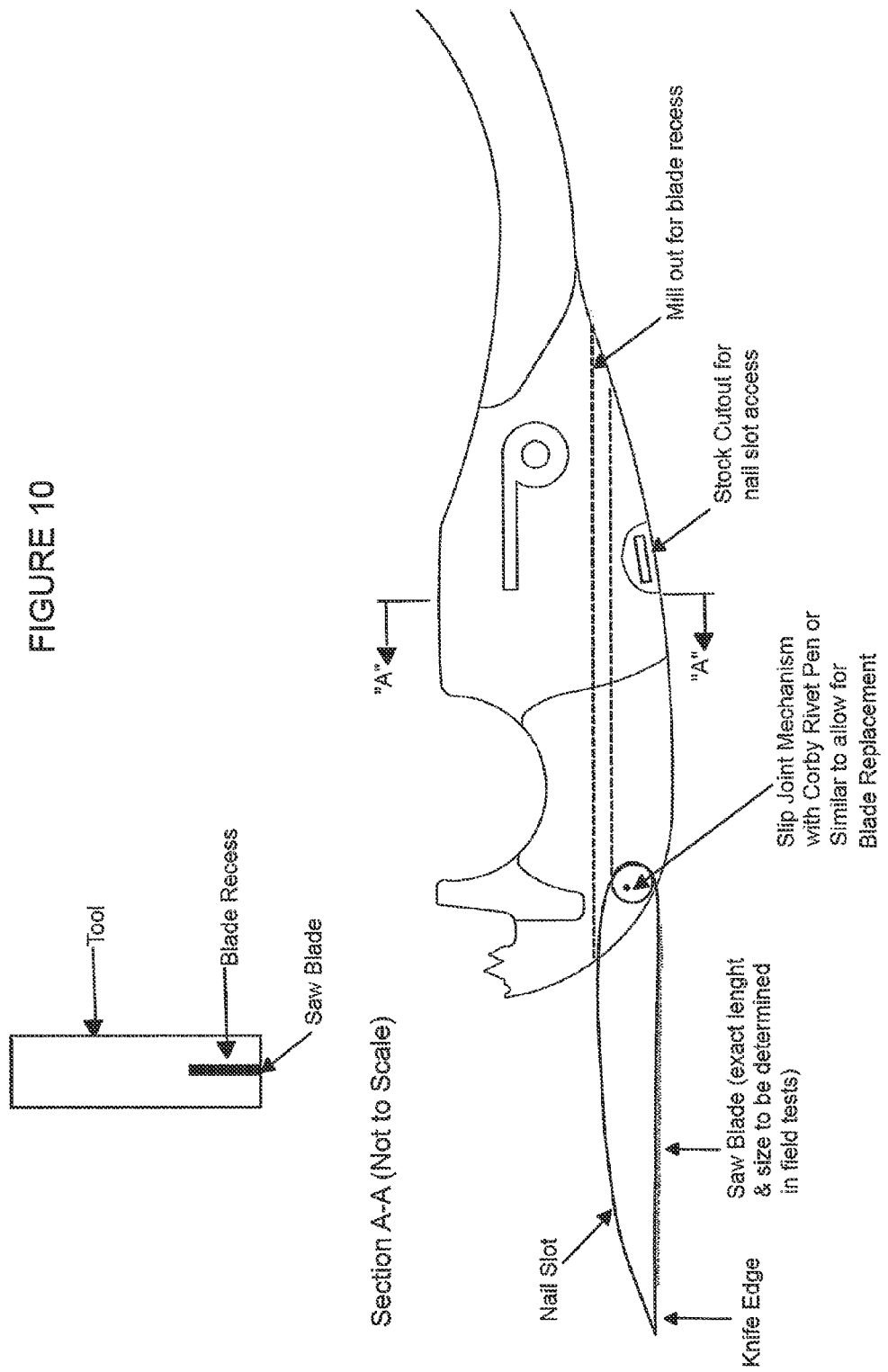

HAND HELD DEER DE-HIDE TOOL

PRIORITY CLAIM

This application claims priority to U.S. provisional patent application No. 61/472,234 filed on Apr. 6, 2011.

THE FIELD OF INVENTION

This invention relates to cutting tools, and more particularly to tools for cutting the hide from an animal.

BACKGROUND OF THE INVENTION

In skinning the hide from an animal, the hunter must cut the hide loose from around the legs, and strip the leg skin back to the animal body where further skinning takes place. Usually, a knife is used to cut around the legs, and then the cut hide is then gripped and pulled toward the body. A tool is needed to assist in this operation.

SUMMARY OF THE INVENTION

BRIEF DESCRIPTION OF THE DRAWINGS

FIG. 3E is a front view of the tool of FIG. 3B.

FIG. 3F is a rear view of FIG. 3B.

FIG. 4 is a top view of one embodiment of a mounting plate.

FIG. 5 is a top view of one embodiment of a cutting edge.

FIG. 6 is a top perspective exploded view of one embodiment of the tool.

FIG. 7 is a bottom perspective exploded view of one embodiment of the tool.

FIG. 8B is a bottom view of the assembled handles of FIGS. 1 and 2 in the fully opened position.

FIG. 8C is a perspective view of the tool of FIG. 8B.

FIGS. 9A, B and C are, respectively, top, side and perspective views of one embodiment of a cutting blade.

FIG. 10 is a top view of one embodiment of the invention including a foldable saw blade.

DESCRIPTION OF THE PREFERRED EMBODIMENT

Figure 1:
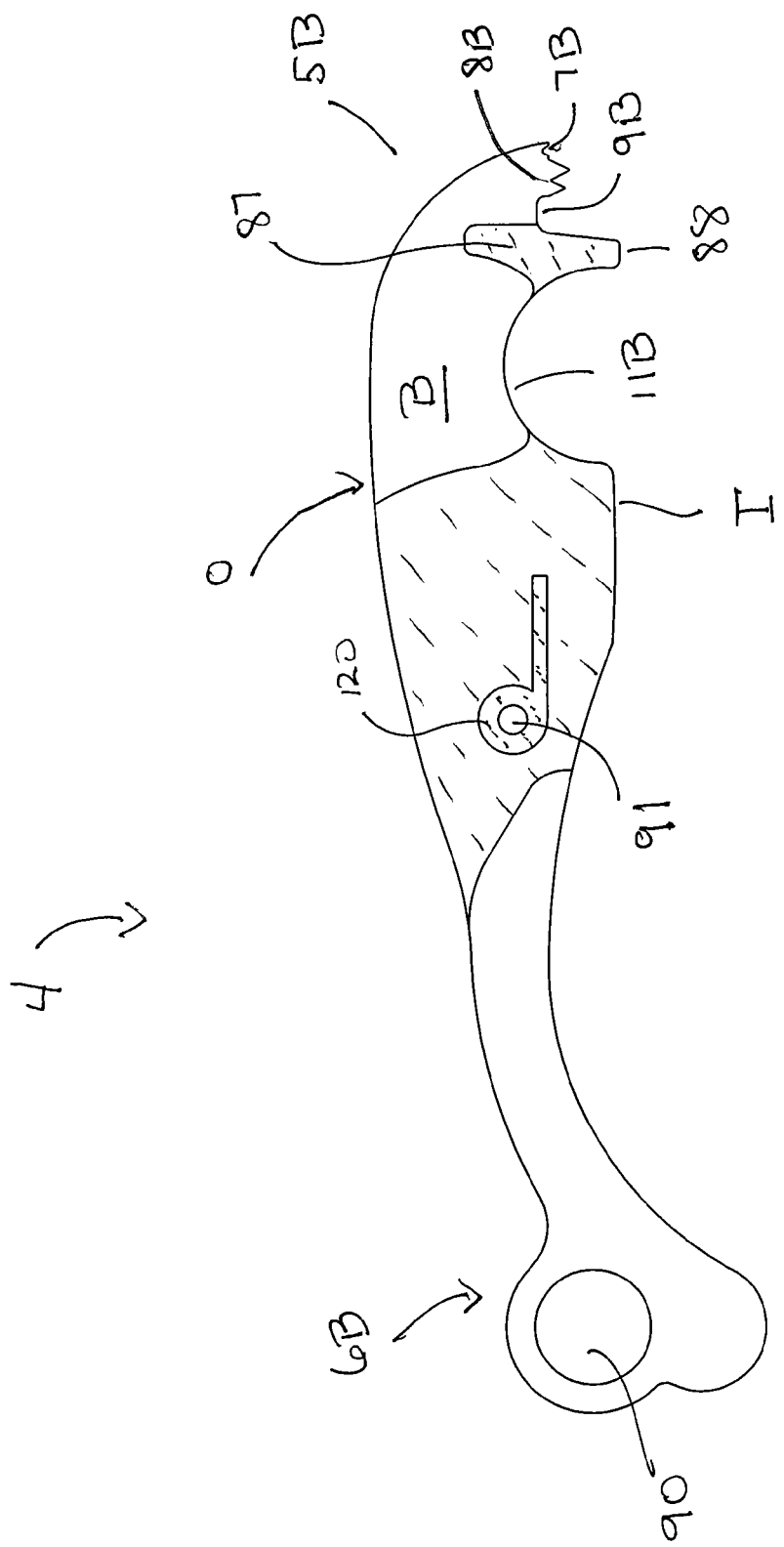
FIG. 1 is a top view of an embodiment of one handle of the tool.
Figure 2:
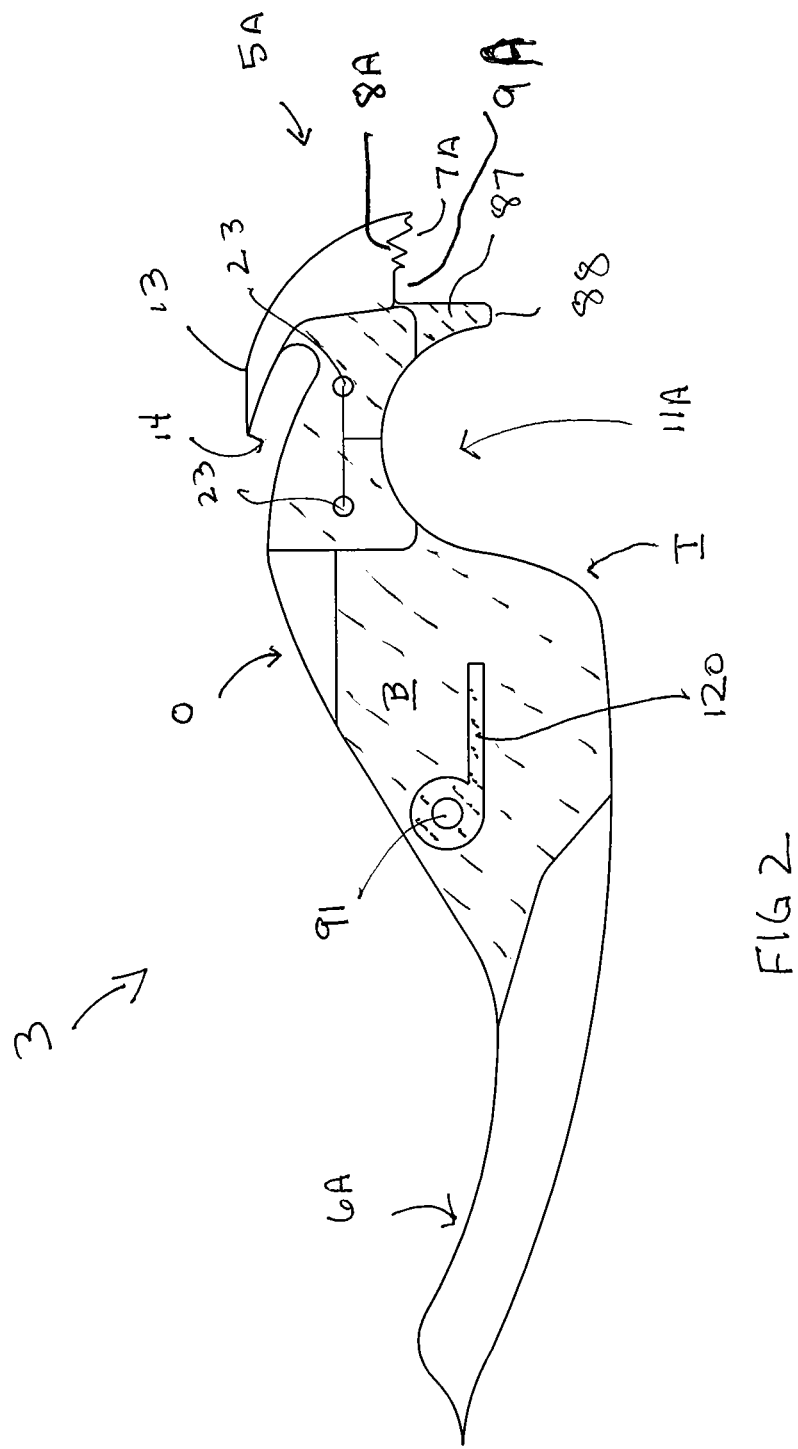
FIG. 2 is a top view of one embodiment of a second handle of the tool.
Figure 3A:
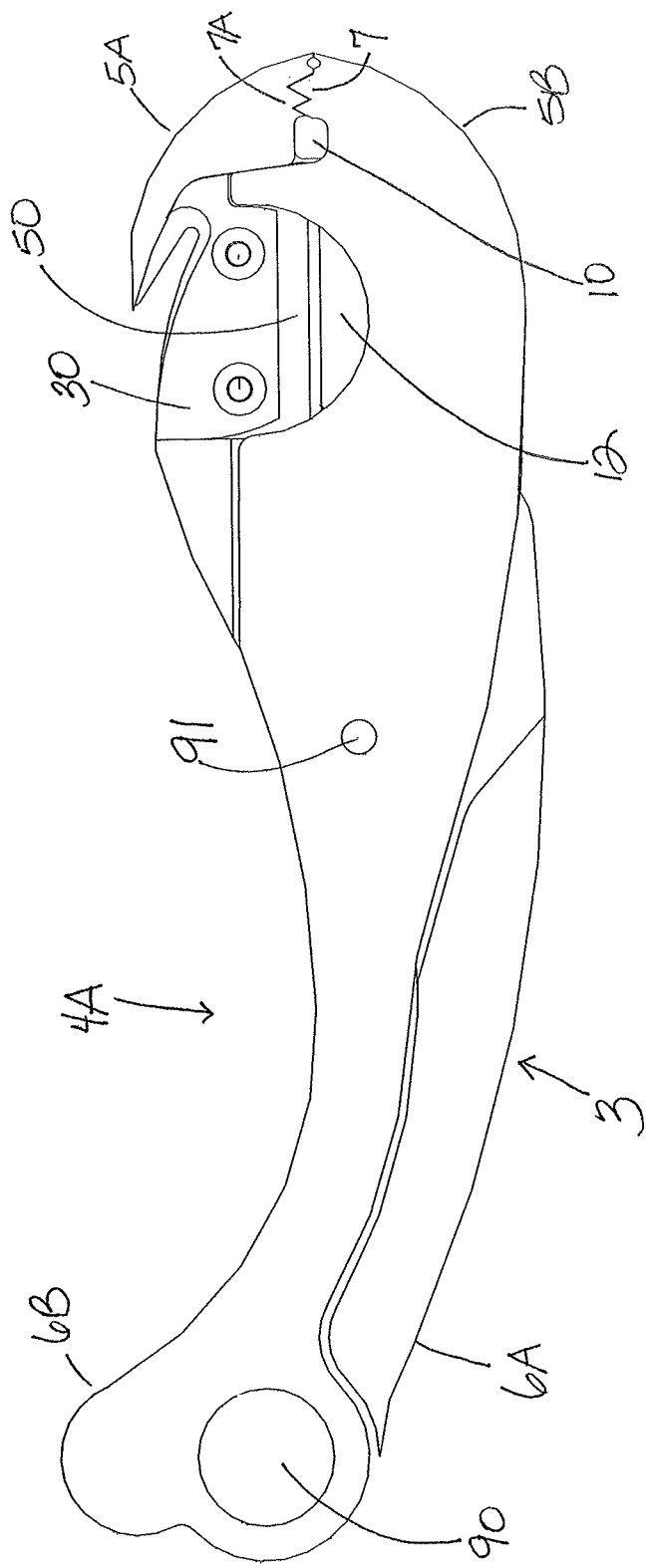
FIG. 3A is a top view of the assembled handles of FIGS. 1 and 2 with the tool in the closed position.
Figure 3B:
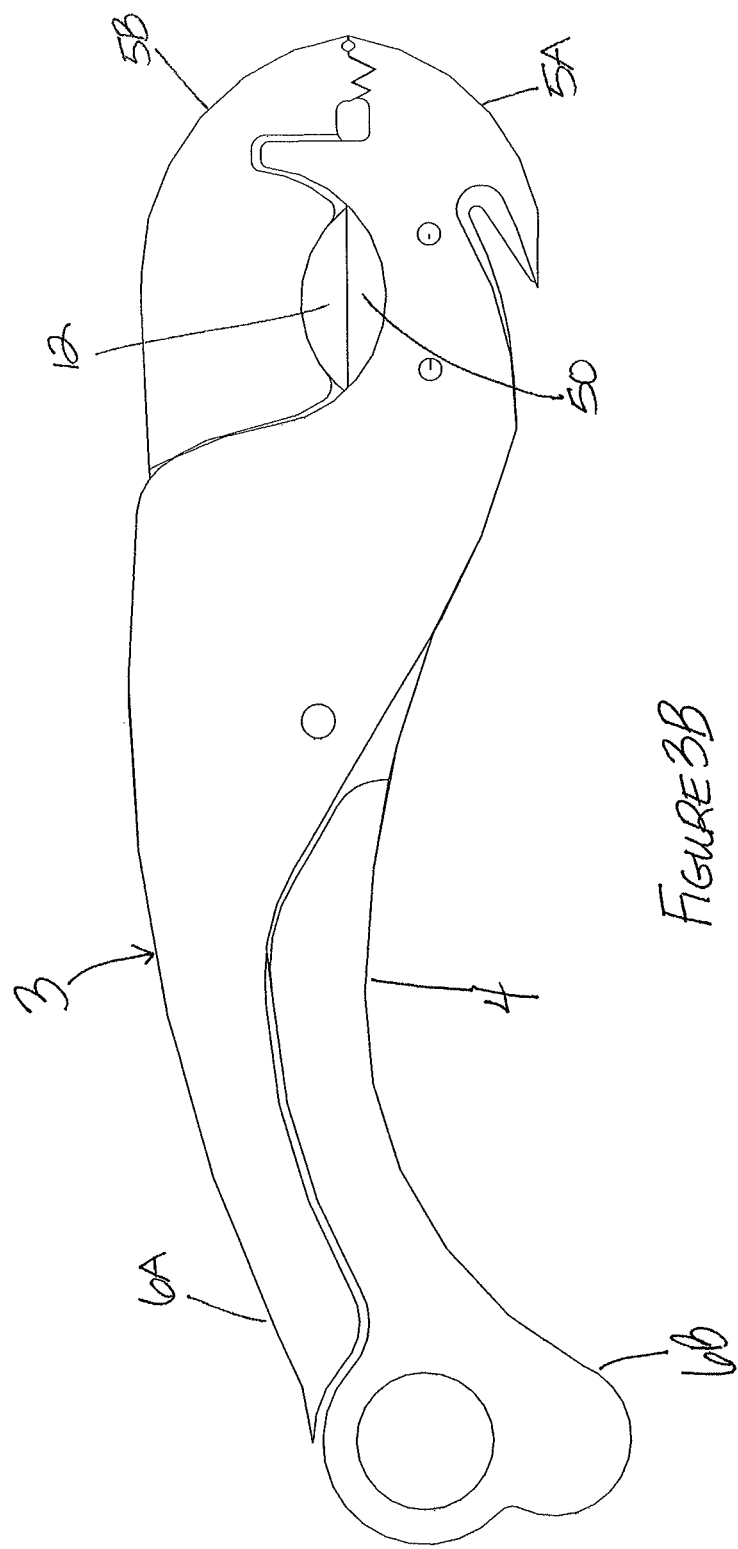
FIG. 3B is a bottom view of the assembled handles of FIGS. 1 and 2 in the closed position.
Figure 3C:
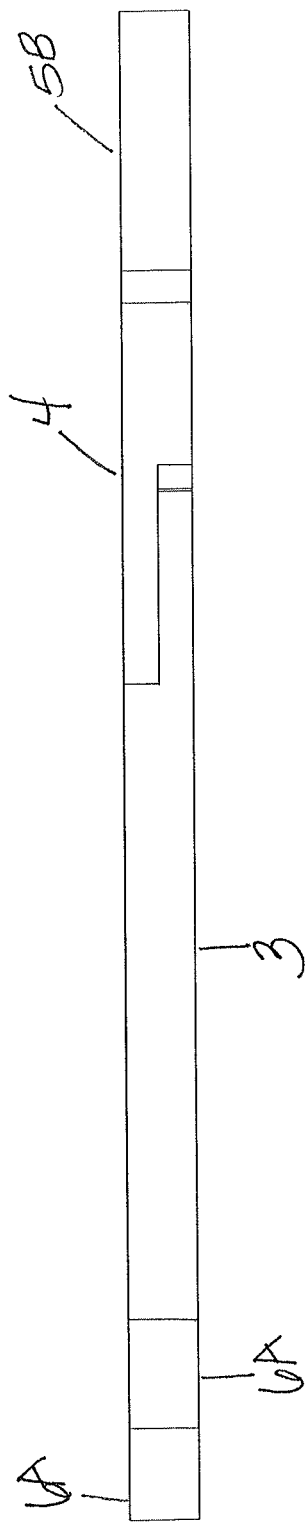
FIG. 3C is a first side view of the tool of FIGS. 3A and 3B.
Figure 3D:
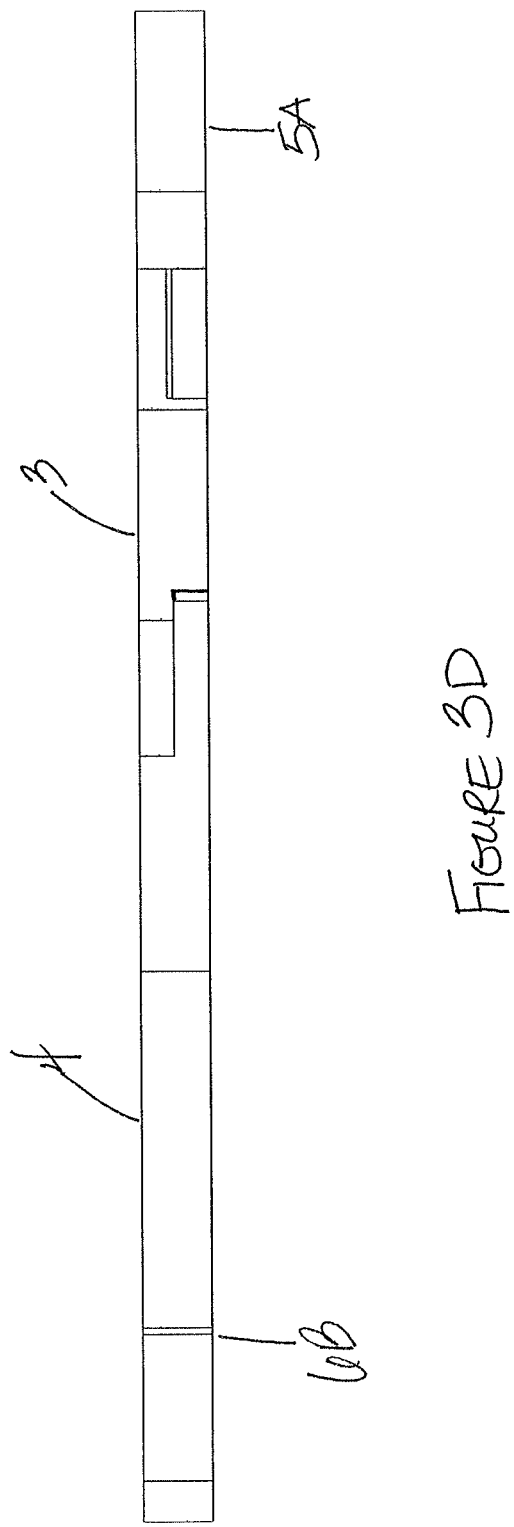
FIG. 3D is a second side view of the tool of FIG. 3A and FIG. 3B.

The tool has two opposable handles 3 and 4 (see in general, FIG. 1-3), each about eleven inches long. Each handle is generally planar, having two side portions (top T and bottom B) and two edge portions (outer edge O and inner edge I) (here "inner" and "outer" generally are respective of the inner and outer edges of the center opening 12 of the tool). The handles can be made of steel (such as stainless) or other sturdy material, such as aluminum or plastic. In the assembled device, the two handles are opposing, that is bottom side B faces bottom side B, and inner edges I face I one another in the area of the center opening. The two handles 3, and 4 are pivotally connected at a pivot point 91, (generally through a pin or rivet that extends though openings 91 in each handle. In use, the handles open and close in the assembled device much like the handles of a scissors. Preferably, the device includes a biasing means, such as a plate or coil spring leaf spring (for instance, a curved plate spring positioned around the pivot pin and bearing on a surface on the handle, such as the inner edge I, not shown, or in and incised area 120 in the bottom B of the handles) or a coiled spring connectable between the handles near the working ends, (not shown)) to bias the handles 3 and 4 toward the closed or cutting position, later described. Each handle has a gripping end 5A and 5B respectfully, and a working end 6A and 6B respectfully. One of the handles preferably has a finger grip (an enclosed loop) positioned on the working end. As shown in FIG. 1, such a finger grip 90 is shown on the working end of handle 4. As used in this description, "forward" refers to the gripping end of the device, while "rearward" refers to the working end of the device.

The gripping ends 5 of each handle terminates in a opposable jaw 7A and 7B, where each opposable jaw 7A and 7B have gripping teeth 8A and 8B, where the teeth 8A and 8B, preferably matingly interface for gripping when the device is closed. Preferably, the teeth have a serrated pattern, (best seen in FIGS. 6 and 7), terminating at the end of the tool with two opposed pincer teeth (not shown). The bottom B of each handle 3, 4 may have a thinned area or incised area (shown as dashed area in FIGS. 1 and 2) where the two handles overlap when assembled, in order to present a more compact flat structure when assembled into a working tool.

Preferably, formed in each handle 3 and 4 on the inner edge, immediately rearward of the teeth 8A and 8B, is a cutout area 9A and 9B respectfully. These cutout areas (where the edge of the tool has a concave or inward curvature) are opposed, so that when the device is in the closed position, the cutouts 9A and 9B form a jaw opening 10 in the closed device. Preferably behind each jaw 7A and 7B is formed a second larger cutout area 11A and 11B on the inner edge I, forming a preferably semicircular or oval shaped cutout in the inner edge of the respective handles (as shown a semicircular cutout of about 2 inches in diameter). These cutouts 11A and 11B are also opposed, so that when the tool is closed (e.g. the opposing jaws are adjacent one another), the two cutouts form a center or interior tool opening 12 through the closed tool (see FIGS. 3—tool in closed position), and preferably form an oval shaped opening. Each cutout area near the jaw terminates in a projecting finger 88. When closed, these projecting fingers mate with an incised area 87 on the opposing handle (best seen in 3B), or on a cutout area 89 on the blade mount (best seen in FIG. 4). In use, these projecting fingers keep the center opening 12 that is inaccessible from the edges of the tool until the tool is almost fully opened (when the overlapping fingers separate and no longer overlap, best seen in FIGS. 8). These projecting fingers help keep the tool from sliding off an animal's leg when the animal's leg is positioned in the center opening for ringing of the hide on the leg.

Mounted or formed on one handle on the outer edge O (shown, in FIG. 2, as formed in handle 3), adjacent the jaw portion 7A, is a rearward projecting finger 13 (e.g. the opening or channel 14 created by this finger faces the rear or working end of the tool). This projecting finger 13 creates a narrow channel 14 in one handle (here handle 3), where the entrance to the channel faces rearwardly on the outer edge O, and the channel is on the opposite edge of the handle from the jaw cutout 11A. The projecting finger preferably thins in thickness toward the channel opening, and in cross section along the length of the projecting finger, appears as wedge shaped. The thin terminating edge of the projecting finger 13 may be rounded. The finger and channel functions as a hook, used as later described.

Mounted on the bottom face of one of the handles is a cutting blade 50 (cutting blades may be located on both handles to form opposable cutting edges, but this is not preferred)). Preferably a replaceable cutting blade is used. One embodiment of a cutting blade is shown in FIG. 5. As shown, cutting blade 50 has a first cutting surface 51, generally a knife edge, and a second cutting surface 52, also a knife edge. Note that the second cutting surface 52 is a curved edge whose curvature is similar to that of channel 14. As shown, first cutting edge is linear, but may also be curved (not preferred). Cutting blade has openings therein 53 that align with openings in one of the handles (in the embodiment shown, openings 23 in handle 3). Mounting plate 30 is shown in FIG. 4. Mounting plate 30 is a shaped planar structure with opening 33 there in that also align with openings 23 in the handle. In use, cutting blade 50 is positioned on bottom of the handle 3, with openings aligned, and mounting plate 30 then placed over the cutting edge, with openings aligned. Threaded attachments such as bolts (or other attaching means) are then used to couple mounting plate 30, cutting blade 50 and handle 3 together. The openings in either the mounting plate or handle 3 are preferably threaded openings to accommodate bolts. As shown, openings 23 in handle are threaded. Instead of threaded openings, coupling nuts could be used in combination with bolts, but this is not preferred.

When cutting blade 50 is coupled to handle, first cutting surface 51 is exposed in the center opening when the tool is in the open position (and may also be exposed when the tool is closed, as shown in FIG. 3), and second cutting surface is exposed in the channel 14. Preferably, as shown, in FIG. 3, cutting blade does not completely obstruct the center opening 12 in the tool when the tool is closed (but it may in alternative embodiments). Cutting surfaces 51 and 52 are positioned on a single cutting blade, but may be located on separate cutting blades.

Alternatively, one handle may be formed with a cutting edge surface integrally formed in the handle. In this instance, if a straight cutting edge is desired, the handle with the formed edge will not have a semicircular or oval cutout, (indeed, the handle may not have a cutout at all).

Figure 8A:
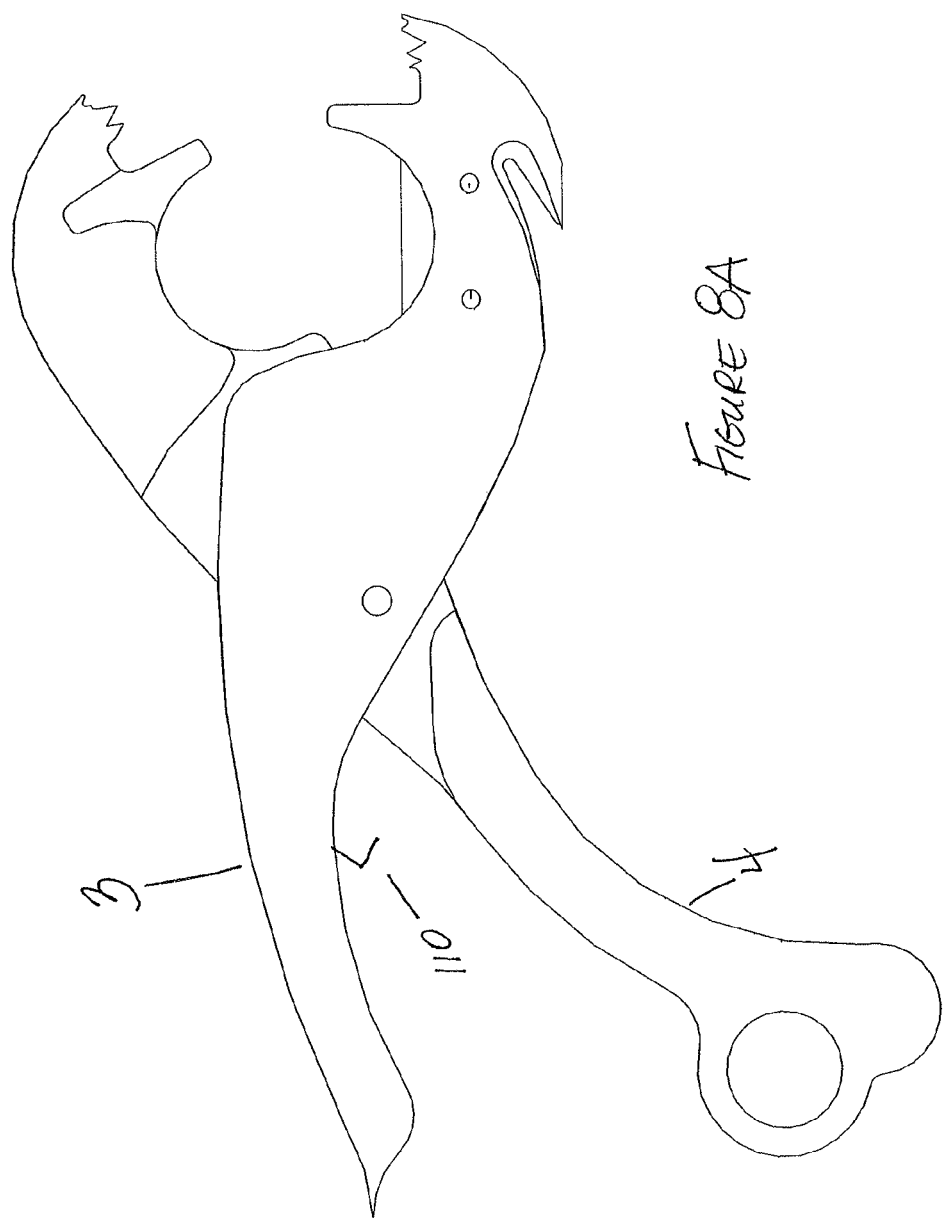
FIG. 8A is a top view of the assembled handles of FIGS. 1 and 2 with the tool in the fully opened position.

The embodiment shown includes a handle compression spring or leaf spring 110, positioned between the handles behind the pivot point 91, which may be only attached to one handle (shown in FIGS. 8A and 8B). This spring 110 opposes both handles and biases the device slightly open. This spring 110 acts only over a short distance when the tool is approaching the closed condition, with the resulting interaction of the center spring and handle spring or biasing devices being that the tool is biased toward the closed position, but handle spring keeps the tool from totally closing (jaws touching) unless a user overcomes the handle spring by squeezing the two handles together. This second spring or biasing means will have no impact when the tool center opening is disposed around the leg of an animal to be skinned. One handle also has a finger hole 90 to assist in use of the device.

The device is used by hunters as follows. To strip the hide from a deer, the hide around the legs must be separated from the animal. The handles 3, 4 are opened against the biasing force so that projecting fingers 88 no longer overlap and cutout areas 11A and 11B are positioned adjacent the leg. The handles are allowed to move towards the closed position (by the biasing means, assisted by gripping if necessary) but cannot totally close due to the leg of the animal positioned in the tool center opening. The movement of the handles toward the closed position forces the cutting surface in the center opening into hide contact, and then penetrating and cutting the animal skin or hide. Biasing means assists in maintaining the device in a closed configuration around the animal's leg. The closed device is rotated around the leg or limb, using finger grip 90, to rotate the partially closed tool. Note that the animals foreleg is generally oval shape, hence the preferred blade is a straight blade. The user does not need to exert substantial force to keep the cutting edge penetrating the skin, due to the biasing means. After sufficient rotations of the device around the leg, the hide is cut through completely around the leg, releasing the skin at the cut. The hook area 13 of the tool is then inserted under the cut area of the hide, with the channel facing the body of the animal, and the tool pulled toward the body of the animal, drawing skin into the opening of the channel, and against second cutting surface, thereby cutting or ripping the skin as directed by the path of the tool. The process is repeated around the remaining legs. The skinning process is then continued, using the hook 13 to further cut the hide along a path selected by the user (such as down the belly), and the opposed gripping jaws used to grip the cut hide and pull the hide away from the animal body to allow cutting of the hide loose from the body, for instance with a knife. The serrated edges of the opposed jaws provide a firm grip on the hide, and the hide opening immediately behind the jaws accommodates a section of the hide, to allow the jaws to be positioned further in from a cut edge of the hide for more secure gripping.

The tool may include a pivoting saw blade (preferably one that cuts on a pull stroke) that is stored in a recess on one of the handles of the tool (or in an incised area between the handles), such as depicted in FIG. 10.

The invention claimed is:

1. A tool comprising a first and second handle, pivotally coupled at a pivot point, said first and said second handles pivoting between a tool open position and a tool closed position, each of said first and second handles having a working end and a gripping end, each handle having a jaw positioned on said working end, each of said handles having a cutout positioned between said pivot point and said jaw, said cutouts being alignable to create an interior opening in said tool when said handles are in said tool closed position, and a first cutting surface positioned on only one of said cutouts, said jaw positioned on a distal end of each of said first and second handles, each of said jaws opposing one another.

2. The tool of claim 1 further having a projecting finger on one of said handles creating an open channel in said handle, and a second cutting surface positioned in said channel.

3. The tool of claim 2 wherein said first cutting surface is disposed on a removable first cutting blade.

4. The tool of claim 2 wherein said second cutting surface is disposed on said removable first cutting blade.

5. The tool of claim 1 wherein said tool has serrated teeth disposed on said jaws.

6. The tool of claim 1 wherein one of said handles has a finger loop disposed on said working end.

7. The tool of claim 1 wherein each of said jaws are matingly engagable when said handles are in a tool closed position.

8. The tool of claim 1 further having a first biasing means to bias said handles towards said tool closed position.

9. A method of skinning an animal using a tool comprising a first and second handle, pivotally coupled at a pivot point, said first and said handles pivoting between a tool open position and a tool closed position, each of said first and second handle having a working end and a gripping end, each handle having a jaw positioned on said working end, each of said handles having a cutout positioned between said working end and said gripping end, said cutouts being aligned to create an opening in said tool when said handles are in said tool closed position, and a first cutting blade having a first cutting surface, said first cutting blade being removably attached to one of said handles so that said first cutting surface is exposed in said opening in said tool when said handles are in said tool open position, one of said handles further having a fixed projecting finger, positioned intermediary said pivot point and said jaw of said handle, said projecting finger having a wedge shape near a termination of said projecting finger, said projecting finger defining an open channel in said tool, and a second cutting surface exposed in said channel;

said method comprising the steps of opening said tool, placing the opposed cutout areas around an animal's leg, moving the handles toward the closed position until the cutting edge contacts the animal's hide, and rotating the tool around the animal's leg until the animal's hide is cut through.

10. The method of claim 9 further comprising the steps of inserting said wedge shaped finger between said cut hide and the animals leg, and pulling said tool down the animal's leg towards the animal's body, thereby cutting the animal's hide along the animal's leg.

11. A tool comprising a first and second handle, pivotally coupled at a pivot point, said handles pivoting between a tool open position and a tool closed position, each of said first and second handles having a working end and a gripping end, each handle having a jaw positioned on said working end, said jaw positioned on a distal end of each of said first and second handles, each of said jaws opposing one another, one of said handles having a cutout positioned between said pivot point and said jaw, the other of said handles having a first cutting surface positioned on said handle so that said cutting surface faces said cutout when said tool is in the tool open position, one of said handles further having a fixed projecting finger, positioned intermediary said working end and said jaw of said handle, said projecting finger having a wedge shape near a termination of said projecting finger, said projecting finger defining an open channel in said tool, and a second cutting surface positioned in said open channel.

12. The tool of claim 11 wherein said first cutting surface is integral with the handle on which said cutting surface is positioned.

13. The tool of claim 11 wherein said tool has serrated teeth disposed on said jaws.

14. The tool of claim 11 wherein one of said handles has a finger loop disposed on said working end.

15. The tool of claim 11 wherein each of said jaws are matingly engagable when said handles are in a tool closed position.

16. The tool of claim 11 further having a first biasing means to bias said handles towards said tool closed position.

* * * * *